United States Patent [19]

Schabert et al.

[11] Patent Number: 4,780,785

[45] Date of Patent: Oct. 25, 1988

[54] DOUBLE-ACTING ROTARY DRIVE FOR A CONTROL DEVICE

[75] Inventors: Hans-Peter Schabert, Erlangen; Erwin Laurer, Möhrendorf; Erich Strickroth, Erlangen; Roland Lippert, Fürth, all of Fed. Rep. of Germany

[73] Assignee: Siemens Aktiengesellschaft, Berlin and Munich, Fed. Rep. of Germany

[21] Appl. No.: 57,249

[22] Filed: Jun. 1, 1987

[30] Foreign Application Priority Data

Jun. 2, 1986 [DE] Fed. Rep. of Germany ....... 3618508
Feb. 5, 1987 [DE] Fed. Rep. of Germany ....... 3703478

[51] Int. Cl.$^4$ .............................................. H02H 7/08
[52] U.S. Cl. ..................................... 361/23; 192/139; 73/843; 251/129.13; 74/686; 74/337; 74/802; 74/705
[58] Field of Search ..................... 361/23, 25, 26, 28, 361/29, 31, 32; 74/677, 681, 686, 705, 802, 337; 192/139; 73/843; 251/129.11, 129.13

[56] References Cited

U.S. PATENT DOCUMENTS

| 4,232,567 | 11/1980 | Hobbs | 74/677 |
| 4,563,624 | 1/1986 | Yu | 361/26 X |
| 4,621,789 | 11/1986 | Fukamachi | 251/129.11 X |

FOREIGN PATENT DOCUMENTS

| 0124477 | 11/1984 | European Pat. Off. | 251/129.11 |
| 862537 | 1/1953 | Fed. Rep. of Germany . | |

*Primary Examiner*—Philip H. Leung
*Assistant Examiner*—Derek S. Jennings
*Attorney, Agent, or Firm*—Herbert L. Lerner; Laurence A. Greenberg

[57] ABSTRACT

A double-acting rotary drive for a control device having an end position fixed in the form of a stop, includes a motor, a torque-changing gear connected to the motor, a driver associated with the torque-changing gear for neutralizing a torque-increasing action of the torque-changing gear or switching on a torque-lowering action after the torque-changing gear rotates through a portion of a total given rotational path thereof, a return travel lock for locking the torque-changing gear in place being released before the driver becomes operative.

33 Claims, 10 Drawing Sheets

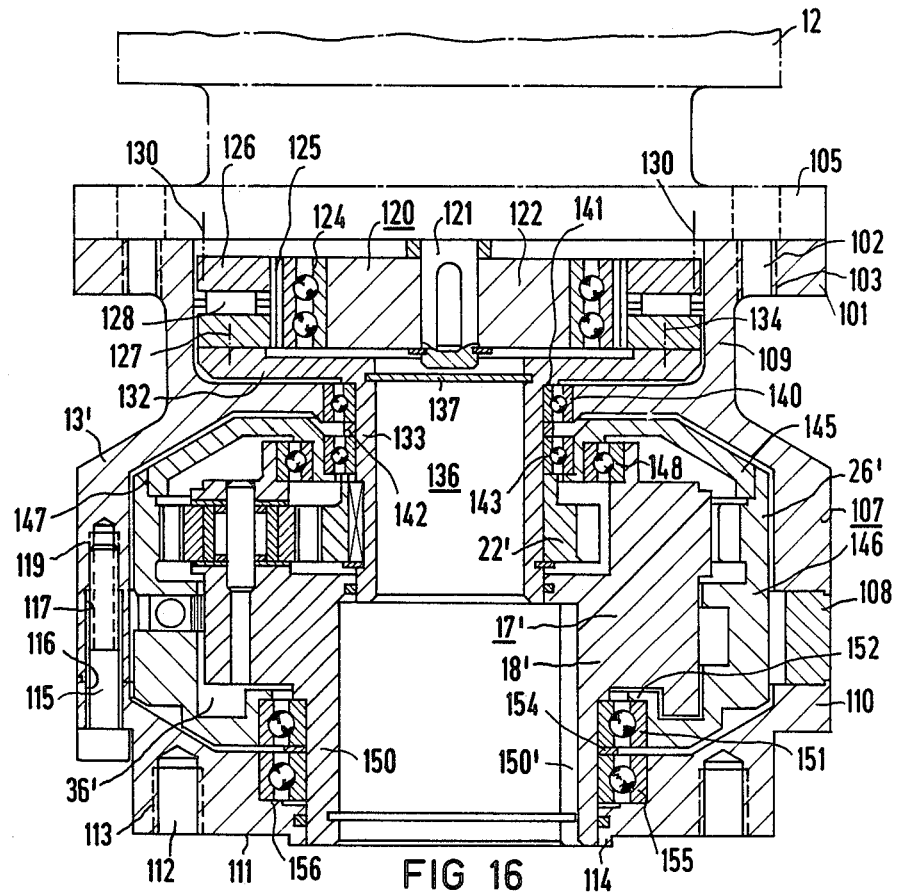
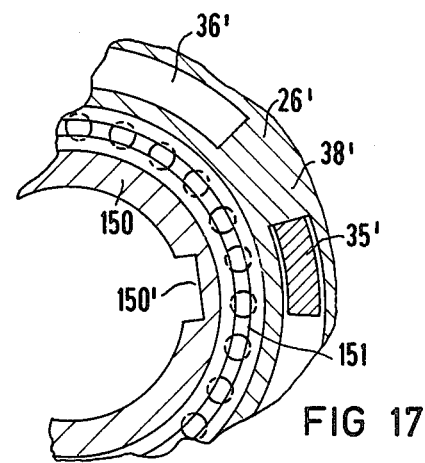

DOUBLE-ACTING ROTARY DRIVE FOR A CONTROL DEVICE

BACKGROUND OF THE INVENTION

1. Field of the Invention:

The invention relates to a double-acting rotary drive for a control device having a fixed end position in the form of a stop, including a motor and a torque-changing gear.

2. Description of the Related Art:

Double-acting rotary drives of this kind are used in particular for actuating fittings, such as valves, slides, flaps or the like, with which flow paths are opened or closed. The end position is predetermined by the closed position of the fitting, in which the movable closure element, such as a valve plate, moves to meet a stop, namely the valve seat. As described in detail in allowed U.S. application Ser. No. 833,847, filed Feb. 26, 1986, a problem which arises is that major retaining forces are produced upon striking the stop, which must be overcome when the fitting is opened. These retaining forces may even increase further during long idle times, especially because of corrosion or the like and then may overload the normal drive. Similar problems can occur if the rotary drive is used for actuating brakes, clamping jaws, doors or the like.

SUMMARY OF THE INVENTION

It is accordingly an object of the invention to provide a double-acting rotary drive for a control device, which overcomes the hereinafore-mentioned disadvantages of the heretofore-known devices and to devise a particularly space-saving and yet sturdy construction of such a rotary drive.

With the foregoing and other objects in view there is provided, in accordance with the invention, a double-acting rotary drive for a control device having an end position fixed in the form of a stop, comprising a motor, a torque-changing gear connected to the motor, a driver associated with the torque-changing gear for neutralizing a torque-increasing action of the torque-changing gear or switching on a torque-lowering action after the torque-changing gear rotates through a portion of a total given rotational path thereof, a return travel lock or pawl stop for locking the torque-changing gear in place, and means for releasing or unlocking the return travel lock before the driver becomes operative.

According to the invention, the gear acts as a "breakway gear". The torque which is thus increased, in fact only serves only to overcome the increased seizing or solid friction in the end positions. This means that travel is at the higher normal speed over the majority of the control path, so that the end positions are reached very much more quickly. The gear can execute a torque-boosting or amplifying action for a high-speed low-torque motor. However, it can also be used with a high-torque low-speed motor, the rpm of which is increased with the gear when torque is lowered for high-speed coverage of the control path.

Since the gear becomes operative mechanically, separate electrical control means used in the prior art which would otherwise be used for shutoff in the vicinity of the end position or upon reaching an increased torque, are no longer needed. Instead, according the invention it is sufficient to use only a simple supply line which, in the case of an electric motor, may be in the form of a supply cable to the motor, such as a rotary current or three-phase cable. The simple control is also advantageous if a pressure fluid motor, that is a hydraulic drive or a compressed air turbine or the like, is used.

The invention also enables a very compact structure to be provided when pawls are used. This means that the size mismatch often observed with small fittings, that is with a rated width up to 50 mm between the fitting and the control drive, disappears. At the same time, the power requirement of the breakaway gear is low because no portable friction arises in the gear, in comparison with conventional control drives having a migrating screw with low efficiency.

Other features which are considered as characteristic for the invention are set forth in the appended claims.

Although the invention is illustrated and described herein as embodied in a double-acting rotary drive for a control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 16 is a fragmentary, cross-sectional view taken along the axis of rotation of a breakaway gear which has been reduced in structural volume by a factor of 1.5 in comparison with the motor and the valve, as compared with the structure shown in FIG. 1;

FIG. 17 is a fragmentary, cross-sectional view of a driver taken at right angles to the axis of rotation;

DESCRIPTION OF THE PREFERRED EMBODIMENTS

Figure 1:
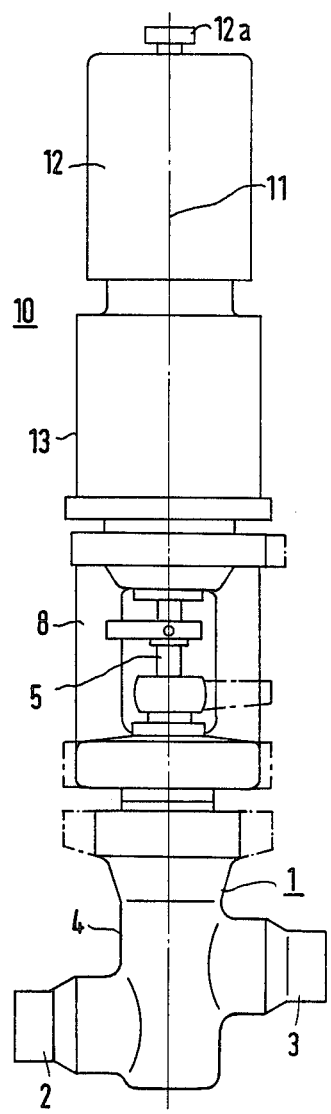
FIG. 1 is an overall diagrammatic, elevational, scale view of a rotary drive according to the invention combined with a valve.

Referring now to the figures of the drawings in detail and first, particularly, to FIG. 1 thereof, there is seen a control device in the form of a valve 1 which is a shutoff or obturator valve having a rated width of 50 mm, with an inlet stub or connecting piece 2 which is offset by a distance with respect to the height of an axially parallel outlet stub or connecting piece 3. A valve housing 4, on which the stubs 2 and 3 are mounted, contains a nonillustrated valve disk which is actuated with a self-locking element such as a valve spindle 5. The valve disk is thus moved in a conventional manner from a closed position in which the valve disk is seated on a valve seat in the form of a stop, into an open position in which the valve disk can rest, such as on a step of the valve housing 4 (back seat). The valve actuation is carried out by motor. To this end, a double-acting rotary drive 10 is mounted on a spacer or so-called lantern 8, through which the outer end of the valve spindle 5 extends. An axis 11 of the rotary drive 10 shown in dot-dash lines, coincides with that of the valve spindle 5.

The rotary drive 10 includes an electric motor 12, preferably a rotary or three-phase current motor, and a breakaway, tripping or pull-off gear 13. The electric motor 12, breakaway gear 13 and valve 1 are screwed together. As the drawing shows, the entire rotary drive 10 is smaller than the valve 1. A small disk 12a is mounted on the free end of the motor shaft to enable manual actuation as needed. The motor fan which is otherwise typically provided is omitted, because it would not be able to develop any perceptible cooling effect during the operation of the motor, which lasts for only a few seconds.

Figure 2:
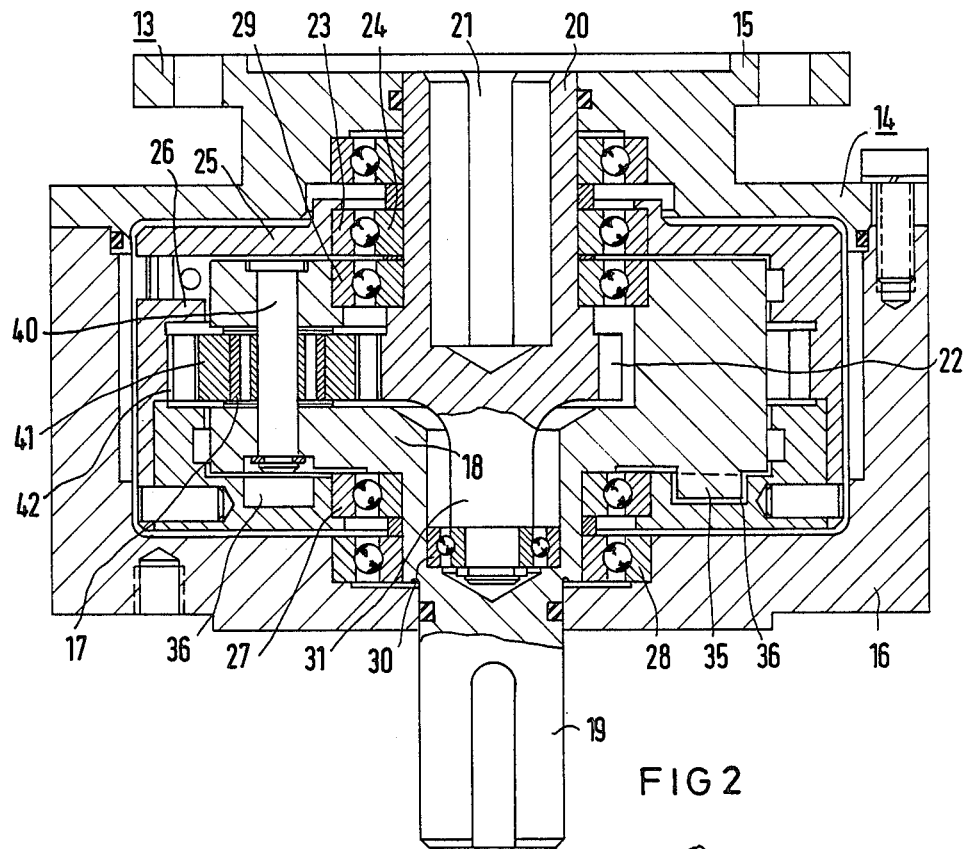
FIG. 2 is a partly broken-away cross-sectional view taken along the axis of rotation through a breakaway gear according to the invention.

As FIG. 2 shows, the breakaway gear 13 includes a housing 14 having a diameter of 160 mm, with an upper part 15 which is in the form of a flange for mounting the motor 12. The upper part 15 forms a cap for a cup-shaped lower part 16, in which a torque-changing planetary gear 17 is disposed. A planet carrier 18 of the gear 17 protrudes downward out of the housing 14 with a central output shaft 19. The shaft 19 is coupled to the valve spindle 5.

Mounted in the upper part 15 is a hollow shaft 20 having a female spline gearing 21, which can be engaged by the non-illustrated shaft of the electric motor 12. The hollow shaft 20 is thus the drive shaft of the planetary gear 17 and at the same time forms a sun wheel 22 of the planetary gear 17. The hollow shaft 20 is supported in the upper part 15 with a ball bearing 23. The hollow shaft 20 carries a hollow ring 26 of the planetary gear 17 through a further ball bearing 24 and an intermediate disk 25. The ring 26 is also supported on the output shaft 19 through a ball bearing 27, directly beside a bearing 28 of the output shaft 19 in the lower part 16.

Figure 3:
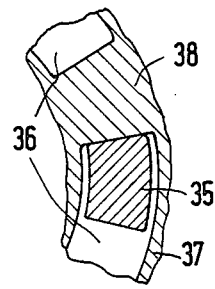
FIG. 3 is an enlarged, fragmentary, cross-sectional view of a portion of FIG. 2.

A ball bearing 29 is seated below the ball bearing 24. The ball bearing 29 forms the upper bearing of the planet carrier 18, in which an end journal 31 of the hollow shaft 20 is supported with an additional ball bearing 30. The planet carrier 18 has a driver or entrainer tooth 35 which protrudes downward into an annular groove 36 in a bottom disk 37 of the hollow ring 26, in which a counterpart tooth 38 is provided at a point on the periphery, as is shown in FIG. 3.

Figure 4:
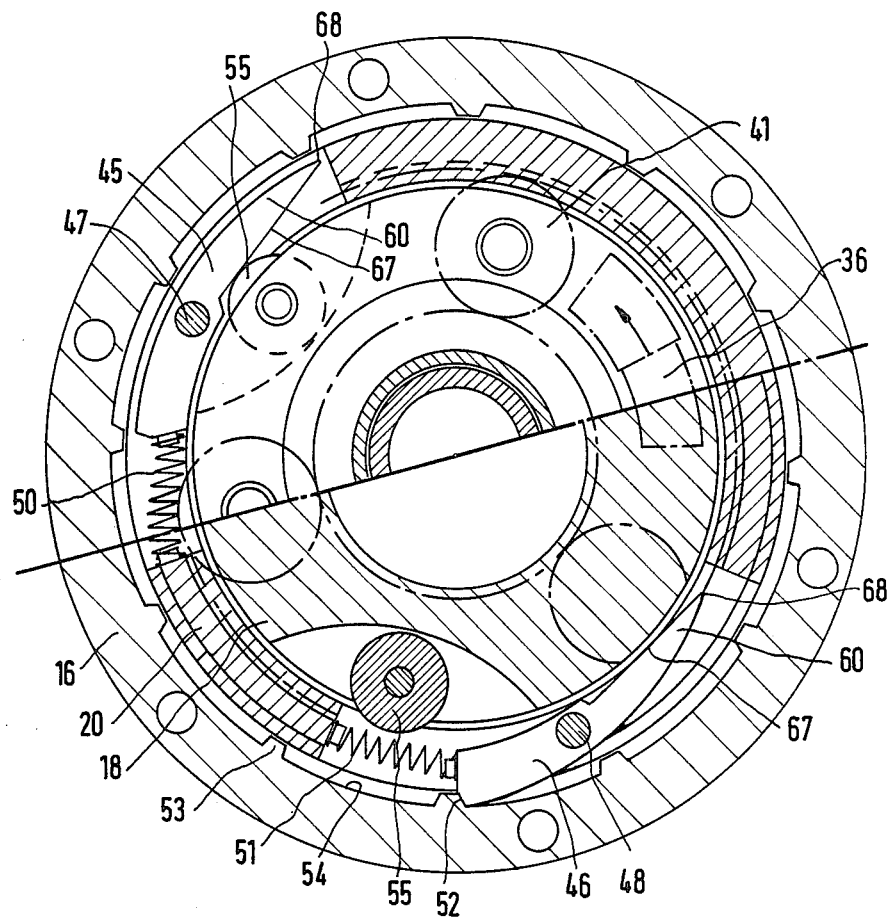
FIG. 4 is a cross-sectional view taken through the breakaway gear at right angles to the axis of rotation.

The planet carrier 18 has pins 40 and three planet wheels 41 distributed symmetrically about the sun wheel 22, which mesh with teeth 42 of the hollow ring 26. As FIG. 4 shows, the planet wheels 41 have approximately half the diameter of the sun wheel 22. The diameter is 30 mm, for example.

Figure 11:
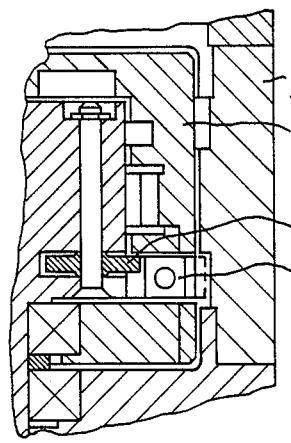
FIG. 11 is a second fragmentary, cross-sectional view of FIG. 5.
Figure 10:
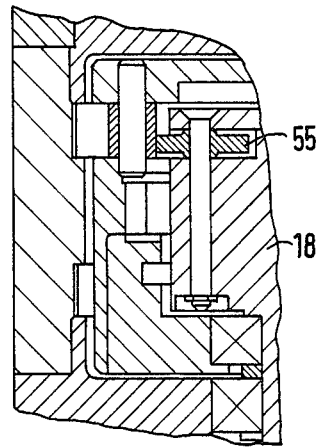
FIG. 10 is a first fragmentary, cross-sectional view taken along the axis of rotation of FIG. 5.

A return travel lock or latch in the form of two blocking elements or pawls 45 and 46, are also provided in the hollow ring 26. The pawls 45, 46 are mutually symmetrical and disposed in such a way that they are pivotable with shafts 47 and 48 at right angles to the axis of rotation, in a plane parallel to the plane of the planetary gear 17. The pawls are braced with springs 50 and 51 on the hollow ring 26. In the locking position, one pawl that is operative in accordance with the direction of rotation, which is the pawl 46 in the illustrated embodiment of FIG. 4, presses with a locking surface 52 thereof against one of a plurality of protrusions 53 that are spaced apart by equal intervals from one another on the inside of the lower part 16 of the housing, thereby creating grooves 54 between the protrusions 53. In order to unlatch the device, the pawls cooperate with two protrusions in the form of rollers 55 supported in the planet carrier 18, which are staggered in the direction of the axis of rotation, as shown in FIGS. 10 and 11. The pawls 45 and 46 and the roller 55 are disposed in such a way that the following operation takes place:

The two pawls which are mutually symmetrically disposed, completely block the rotation of the hollow ring 26 relative to the housing 14 in the engagement position thereof, that is they allow only only a small amount of play which is necessary for freely releasing the latches. In order to release the pawls, the rollers 55 run up on an extension 60 of the pawls, having a bearing surface 67, which for the most part approximately corresponds to a circular arc that is plotted about the axis 11 of the rotary drive, in the position in which the pawl is out of engagement with the housing 14. This structure is provided in order to prevent the force exerted by the springs 50, 51 from being able to generate any restoring movement with which the rollers 55 would be pressed out of the way by the pawls 45, 46. In the illustrated embodiment, the bearing surface 67 is simplified in the form of a straight line that is approximately at a tangent to the circular arc. However, in the locking position, tips 68 of the pawls should be located approximately on the circular arc, so that the pivoting movement of the pawls by the rollers 55 will not be performed abruptly but rather over a longer rotational path.

With the above-described novel rotary drive, the sun wheel 22 of the planetary gear is actuated in one or the other direction of rotation by the motor 12, depending on whether the valve 1 is to be opened or closed. During this process, the driver tooth 35 rotates in the annular groove whenever the output shaft 19 is firmly retained, because the valve exerts a straight resistance in the end position thereof. The planetary gear 17 produces an increase in torque, in a ratio of approximately 1:3, because the planet wheels 41 roll of on the hollow ring 26 as long as the hollow ring is fixed relative to the housing 14 by one of the two pawls 45 and 46. With this high torque, the retaining force in the end position of the valve 1 is reliably overcome. The planetary gear thus operates as a "breakaway gear".

After one revolution of the planet carrier 18, the pawl which remains in the position of engagement with the housing 14 in the illustrated embodiment of the pawl 46, is unlocked by the associated roller 55. As a result, the hollow ring 26 can be driven along as well by the driver tooth 35. This means that the sun wheel 22 and the planet wheels 41, as well as the hollow ring 26, are moved at the same rotational speed. This speed acts as a rapid motion or high speed, since it amounts to three times the speed provided during operation of the breakaway gear.

During the rapid motion or high speed, the valve is moved into the other end position. The output shaft 19 is thereby firmly retained. The motor 12 is braked, stopped and shut off.

In order to provide movement in the opposite direction, the motor 12 is reversed. Due to the change in rotational direction, once again the pawl that is in engagement is released first. The planetary gear 17 operates as a breakaway gear and thus assures a reduced rpm and a reduced torque until such time as the driver tooth 35 runs up on the other side of the counterpart tooth 38, after approximately one revolution of the planet carrier 18. Once again, with a shutoff of the planetary gear 17, the rapid motion of high speed is used until the other end position is reached.

Figure 5:
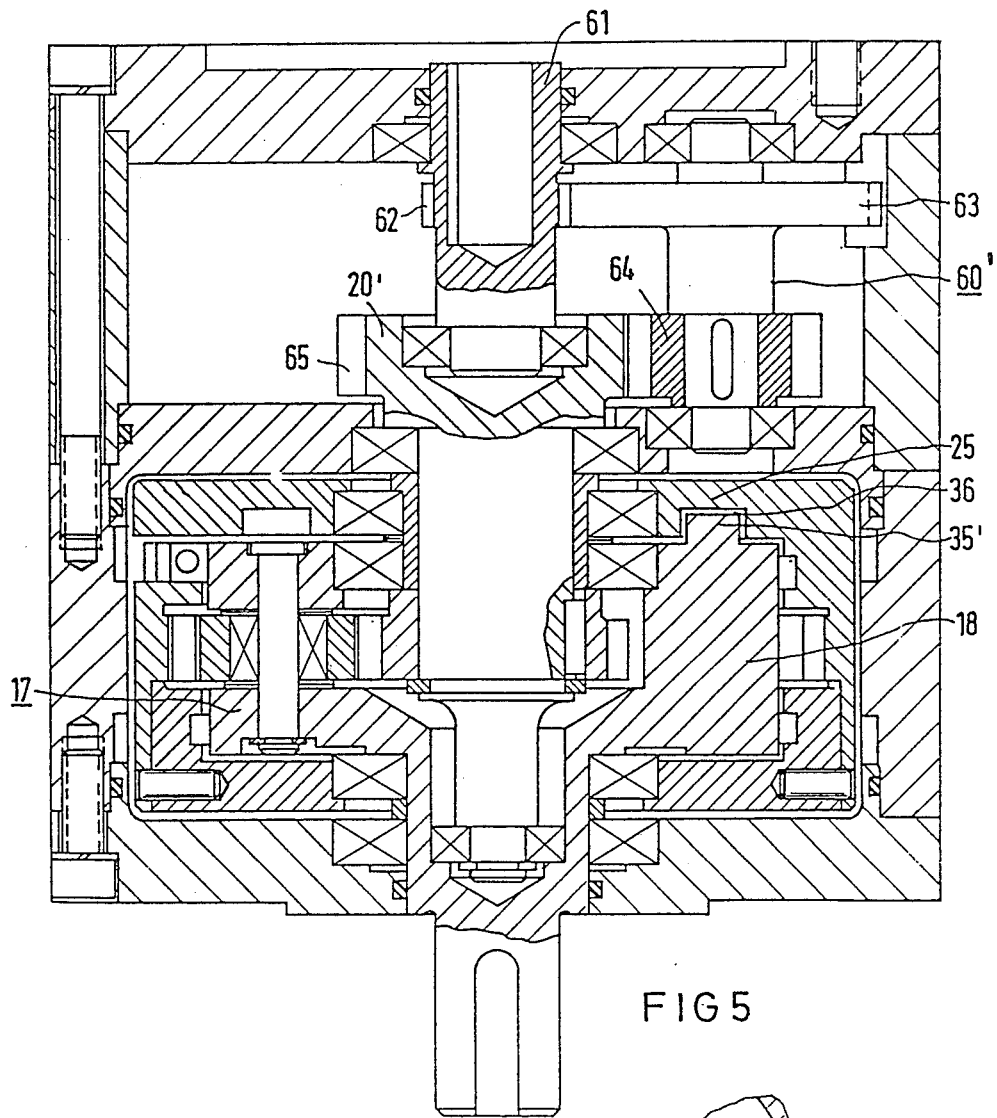
FIG. 5 is a cross-sectional view similar to FIG. 2 of an embodiment of a breakaway gear having a layshaft, which is taken along the axis of rotation.
Figure 6:
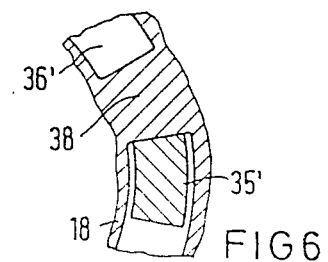
FIG. 6 is a view similar to FIG. 3 of a portion of FIG. 5.

In the embodiment illustrated in FIG. 5, the breakaway gear 17 is actuated through a two-stage layshaft or intermediate shaft or gear 60'. The two-stage layshaft 60' includes an input shaft 61 with teeth 62. A large wheel 63, which is coaxially connected to a pinion 64, meshes with the teeth 62. Teeth 65 on a drive shaft 20' of the planetary gear 17 mesh with the pinion 64. This configuration is well suited for a high-speed motor, such as a 4-pole rotary current or three-phase motor. The maximum breakaway moment of the breakaway gear 13 may be on the order of 150 Nm, while the opposite end stop is approached at rapid motion or high speed, such as at 50 Nm.

In the embodiment illustrated in FIG. 5, the driver tooth 35' of the planet carrier 18 is disposed on the top thereof. In this case, the annular groove 36' is located in the body of the intermediate disk 25, which is correspondingly thicker in this embodiment.

Figure 7:
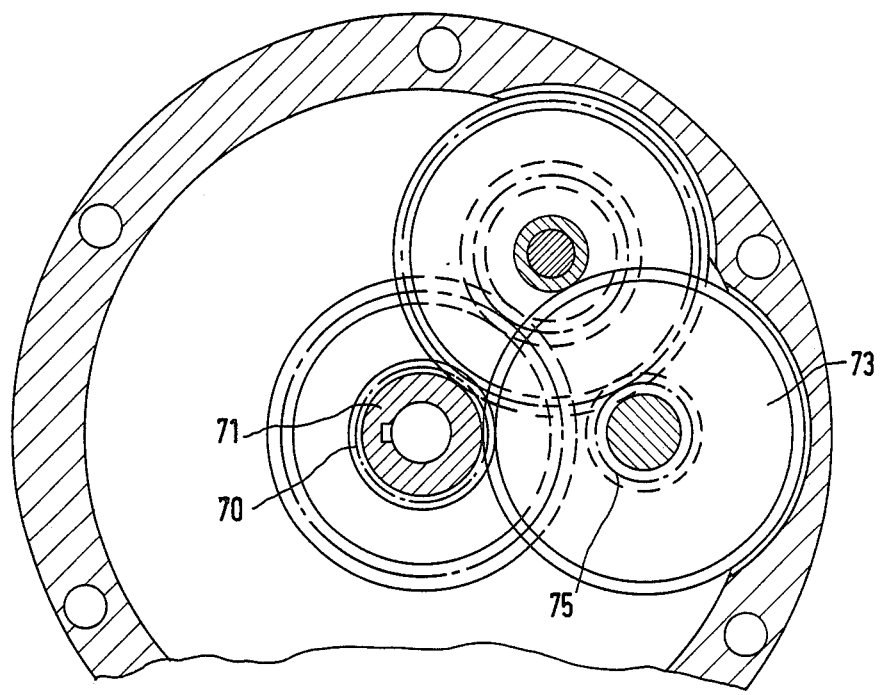
FIG. 7 is a fragmentary, cross-sectional view of the gear and layshaft of FIG. 5.
Figure 8:
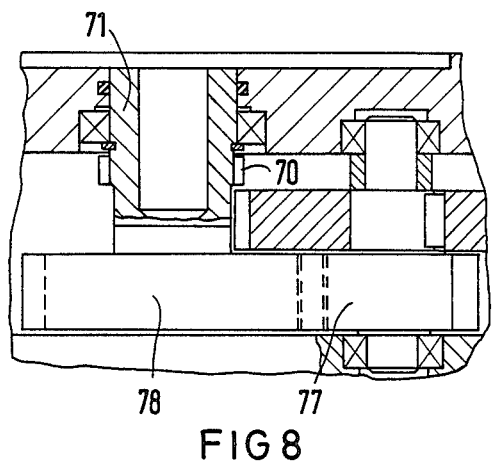
FIG. 8 is a fragmentary, cross-sectional view taken at right angles to the view of FIG. 7.
Figure 9:
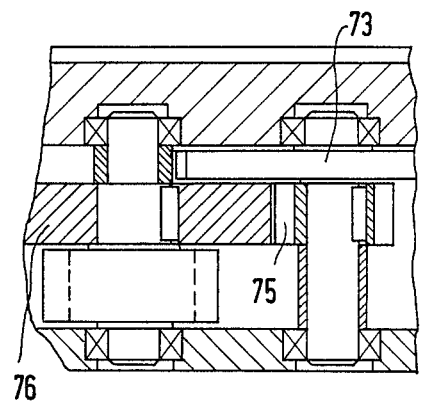
FIG. 9 is another fragmentary, cross-sectional view of the device shown in FIG. 7.

FIGS. 7, 8 and 9 shows that the layshaft can also be constructed in three stages. The layshaft therefore includes a pinion 70 on an input shaft 71, which may have twenty-one teeth. The pinion 70 meshes with a first gear wheel 73 having forty-eight teeth, which is connected to a further pinion 75 having ten teeth. An intermediate wheel 76 having twenty-nine teeth meshes with the pinion 75. A third pinion 77 coupled with the intermediate wheel has twelve teeth and meshes with teeth 78 of the drive shaft of the planetary gear 17. In this case the drive shaft has twenty-two teeth. The overall gear is small in structure and has a gear ratio of 1:12.15.

Figure 12:
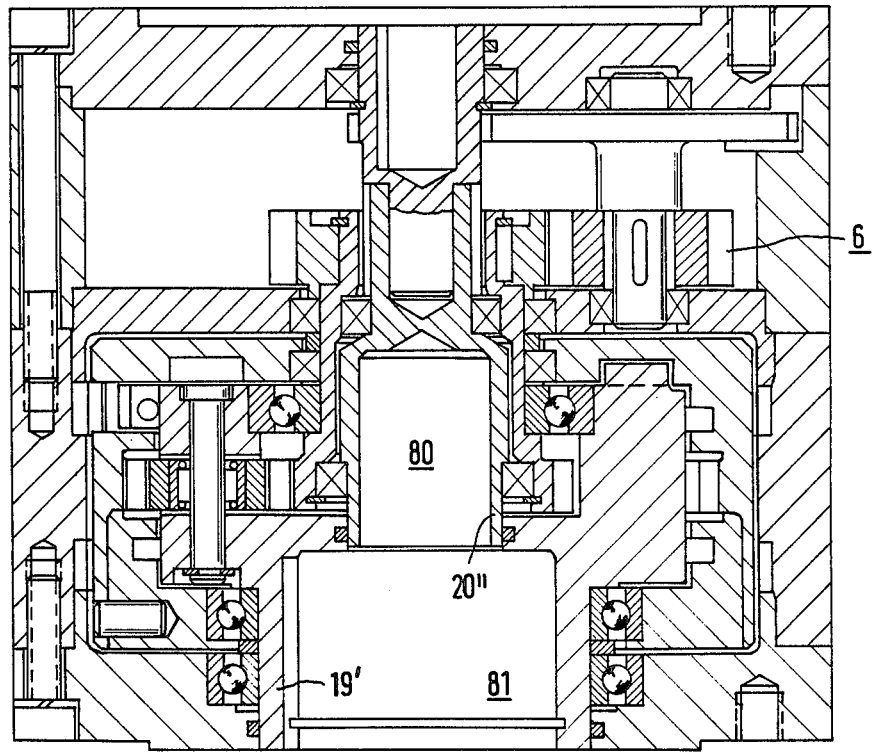
FIG. 12 is a partly broken-away cross-sectional view of another embodiment of a breakaway gear taken along the axis of rotation.

The breakaway gear of FIG. 12 again hasa a two-stage layshaft like the layshaft 60, with gear ratios of i=36 and i=12. However, a drive shaft 20" and an output shaft 19' of the rotary drive 13 in this case are both hollow. Hollow spaces 80 and 81 provide space for an actuating spindle that migrates upward, so that a particularly compact overall structure is possible.

Figure 13:
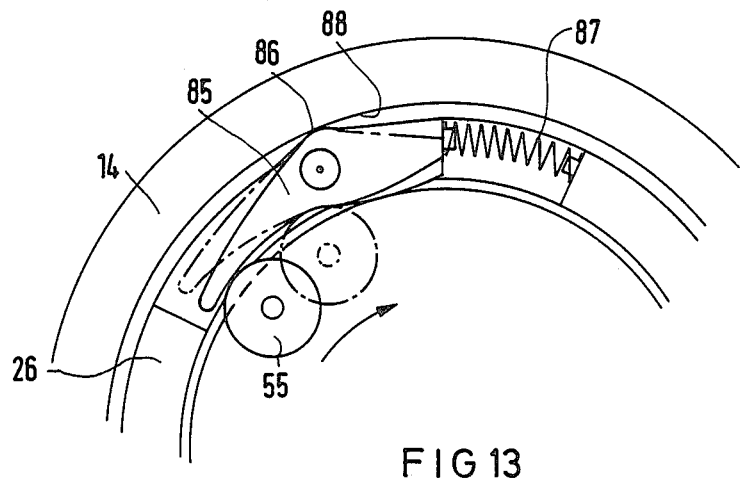
FIG. 13 is a fragmentary, simplified, plan view of a toggle lever used as a driver.

In the embodiment illustrated in FIG. 13, it is shown that the pawls 45 and 46 are replaced with a toggle lever 85. The toggle lever has an interlocking or stop cam 86 which presses against an inner cylindrical wall 88 of the housing 14 under the influence of a spring 87, in such a way that by self-boosting or self-energizing, the friction lock leads to a complete fixation. This makes permits a continuous fixation during the circumferential movement between the hollow ring 26 and the housing 14. In order to release this fixation, the toggle lever is pushed away from the roller 55 that is supported in the planet carrier 18.

Figure 14:
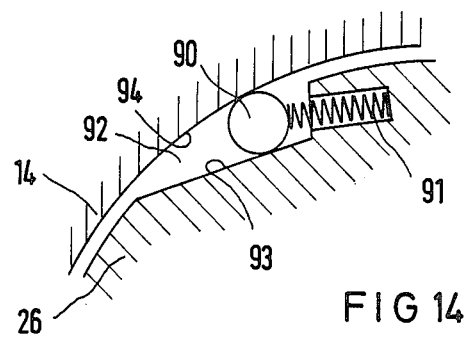
FIG. 14 is a fragmentary, simplified, plan view of a form of an over-running clutch or roller-type free-wheel used as the driver.

FIG. 14 shows that a force-locking connection between the housing and the hollow ring 26 can also be attained by means of rotational bodies 90, especially cylindrical rollers, which are pressed into a wedge-like gap 92 between a straight pressure surface 93 and the cylindrical inner surface 94 of the housing 14, under the influence of a spring 91. A force-locking connection is one which is connects two elements together by force external to the elements, as opposed to a form-locking connection which is provided by the shapes of the elements themselves. Special pivot shafts can be dispensed with in this embodiment. Accordingly, the result is a very simple structure.

Figure 15:
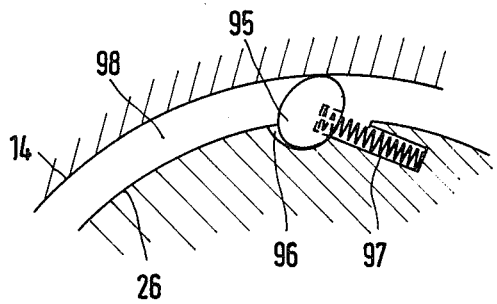
FIG. 15 is a fragmentary, simplified, plan view of a toggle lever used as the driver, which may be provided without a pivot shaft.

FIG. 15 shows an embodiment of the pawls in the form of a roller body 95, having an oval cross section as shown in the drawing. The roller body rests in a rounded depression 96 on the outer periphery of the hollow ring 26. The roller body is pressed into a gap 98 between the outside of the hollow ring 26 and the inside of the housing 14 by a spring 97, which at the same time may produce the necessary fixation.

A breakaway gear 13' shown in FIG. 16 is connected to the motor 12 which is shown in phantom, by a flange 101. The flange 101 has screw holes 102 having a thread 103 (such as an M6 or M8 thread). The flange 101 is joined to a motor flange 105 at that location.

The flange 101 is part of a multi-part housing 107. The housing includes an insert in the form of a steel ring 108, while an opposite part or housing shell 109 is formed of lightweight metal, such as cast aluminum, like a part or housing shell 110 below it. The part 110 which is an output-side housing shell has an attachment surface 111 with blind bores 112, which have a thread 113. Once again, the thread may be M6, M8 or the like and may correspond to a standardized attachment of control drives to fittings (for example in accordance with German standards DIN 3210). Protruding from the attachment surface 111 is a step 114 for centering a control device. The parts 108-110 of the housing 107 are interconnected with screws 115, which pass through bores 116 and 117 of the housing parts 108 and 110 and are screwed into threaded bores 119 in the housing part 109.

In the vicinity of the flange 101, the housing 107 has a two-disk sliding wedge gear 120, which surrounds a motor shaft 121. An oval wheel 122 is secured on the motor shaft 121 in such a way that it is fixed against relative rotation with a wedge and a deformable ball bearing 124 which also has an oval shape, is mounted on the oval wheel 122. The ball bearing 124 has a band-like toothed ring 125, which may have forty-one teeth. The toothed ring 125 meshes overall with teeth of an upper disk 126 and a lower or output disk 127 of the wedge gear 120, which slide on one another through rollers 128. The disks 126 and 127 that mesh with the toothed ring 125 have different numbers of teeth. In the illustrated embodiment there are, for instance, forty to forty-two teeth. The result, in cooperation with the only local engagement in the toothed ring 125 (at two opposed points on the periphery) is a gear ratio of 1:20. In other words, at a rotary speed of the motor shaft 122 of 2800 rpm, the hollow shaft has a rotary speed of 140 rpm. The disk 126 is connected by pins or screws 130 to the motor flange 105, so as to be fixed against relative rotation. A flange body 132 of a hollow output shaft 133 is secured by pins 134 on the disk 128. The interior 136 of the hollow shaft 133 is sealed off from the motor shaft 121 by a sheet-metal disk 137, which is pressed into indentations in the hollow shaft 133. The spacing between the sheet-metal disk 137 and the end surface of the motor shaft 121 oriented toward the sheet-metal disk 137 is made as small as possible. In the illustrated embodiment, the spacing is 1.5 mm.

The hollow shaft 133 is radially guided in the housing 107 by a ball bearing 140, the inner race of which can also transmit an axial force, when it rests on a shoulder 141 of the flange body 132. A second ball bearing 143 on the hollow shaft 133 is located below the ball bearing 140 and spaced apart therefrom by a spacer ring 142. A sun wheel 22' of a planetary gear 17' which borders on the second ball bearing 143, provides a boosting of torque for the "startup" range, as in the above-described embodiments.

The hollow ring 26' of the planetary gear 17' is supported on the outer race of the ball bearing 143. The hollow ring is formed of an upper part 145 and a lower part 146. The two parts mesh with one another at a location 147 in the axial direction. In the inside of the upper part 145 is a ball bearing 148, which forms the support for the planet carrier 18' nearer the motor. The ball bearing 143 can transmit axial bearing play to the outer race thereof and can emit the bearing play through a collar to the upper part 145, which can also transmit axial bearing play through a ball bearing 148. The end of the planet carrier 18' facing away from the motor leads to the lower surface of the housing 107, in the form of a hollow shaft 150 having a female spline 150'.

The lower surface of the hollow ring 26' is again supported on the hollow shaft with a ball bearing 151, so that the support is both in the radial direction and in the axial direction, with the aid of the protrusion 152. A further ball bearing 155 of the hollow shaft 150 is disposed alongside and spaced apart from the ball bearing 151 by intermediate ring 154. The outer race of the ball bearing 155 is also fixed in the axial direction on a shoulder 156. The axial assembly clearance is adjusted by a suitable thickness selected for the intermediate ring 154.

FIG. 17 shows the hollow ring 26' once again, with an annular groove 36' engaged by the tooth 35' of the planet carrier 18', acting as a driver which cooperates with a stop 38'.

Figure 18:
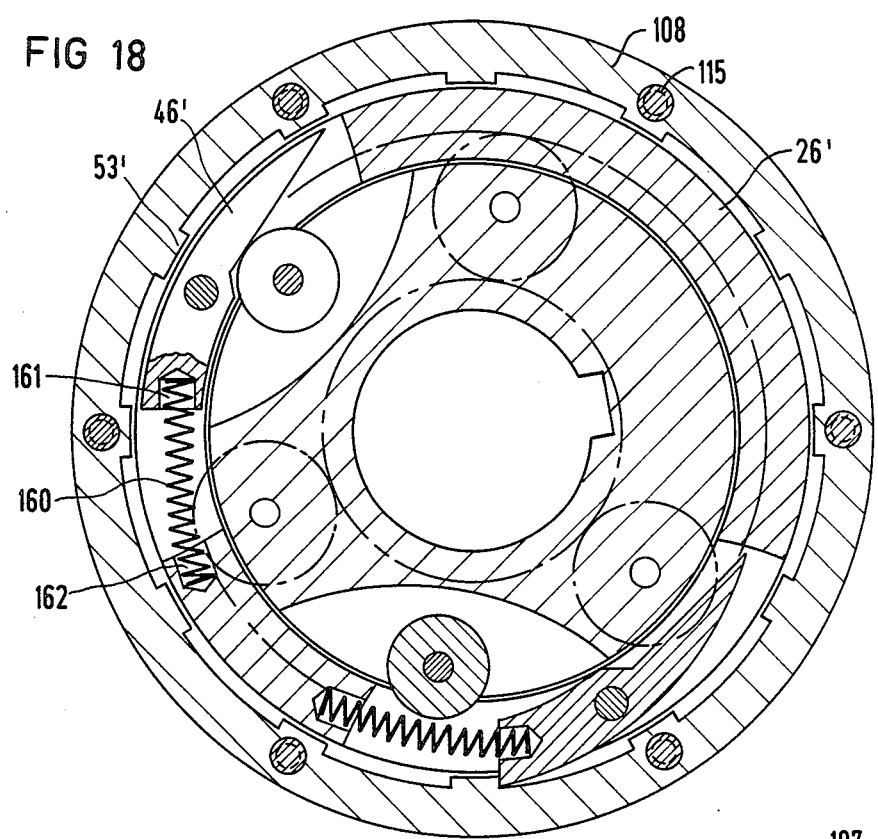
FIG. 18 is a cross-sectional view taken at right angles to the axis of rotation.
Figure 19:
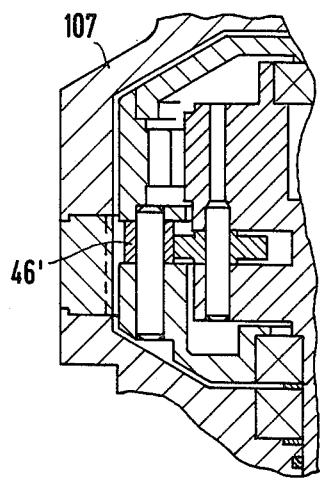
FIG. 19 is a fragmentary, cross-sectional view of an interlocking or blocking member taken at right angles to the axis of rotation.
Figure 20:
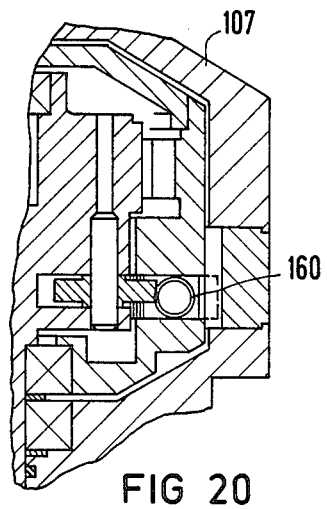
FIG. 20 is a view similar to FIG. 19 of a resetting roller taken at right angles to the axis of rotation.

FIG. 18 is a section taken at right angles to the axis of rotation, showing the configuration and actuation of the pawls 46', as already described above in connection with FIG. 4. However, in FIG. 18 the pawls 46' are pre-stressed with the aid of helical springs 160, which engage bores 161 in the pawls 46' and bores 162 in the hollow ring 26'. In the FIG. 18 configuration, the helical springs 160 act as spiral springs having a low spring constant, so that major forces are not brought to bear with the desired deflection. The pawls 46' in this embodiment cooperate with protrusions 53', which are provided on the ring 108 that is formed of steel. The axial disposition of the pawls 46' and the association thereof with the housing 107 is visible in FIGS. 19 and 20.

Figure 21:
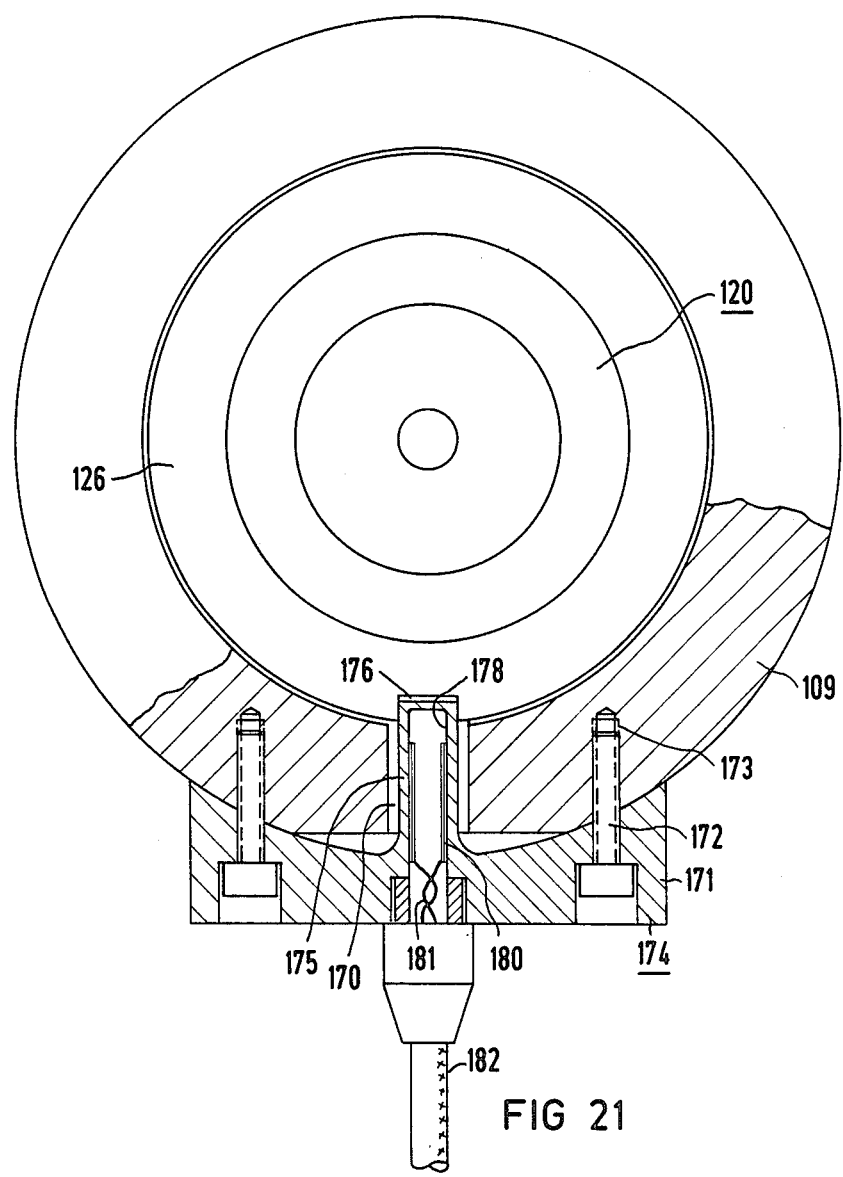
FIG. 21 is a fragmentary, simplified view which is partly broken-away in section, at right angles to the axis of rotation, with a gauge for the torque operative at the gear.

FIG. 21 shows that a radial bore 170 may be provided in the housing part 109, the bore being closed off from the outside by a cap 171, which is secured with screws 172 and threaded holes 173. The cap 171 is part of a force gauge 174, which measures the torque of the gear 120 on the basis of its spacing from the axis of rotation. The gauge includes a hollow mandrel 175 protruding through the bore 170, which has a tip in the form of a pickup for measured values, that engages a groove 176 in the disk 126 of the sliding wedge gear 120, which is then no longer fixed against rotation. Strain gauges 180 are secured to the inner surface 178 of the hollow mandrel 175 and connecting wires 181 thereof lead to a cable 182. The strain gauges 180 can detect the torque that is brought to bear with the sliding wedge gear 120 upon the hollow shaft 133, when the control drive is in operation. This makes it possible to monitor the operation of the control drive. For example, it is also possible to provide controls that assure that the drive motor 12 is shut off even before a previously set time-dependent shutoff becomes effective. This reduces the time for switching on the motor, which is necessitated by standstills, after reaching the mechanical stroke limitation, so that if the rotary drive is actuated frequently, this provision can lessen a possible destructive heating of the motor.

We claim:

1. Double-acting rotary drive for a control device having an end position fixed in the form of a stop, comprising a motor, a torque-changing gear connected to said motor, a driver associated with said torque-changing gear for neutralizing a torque-increasing action of said torque-changing gear or switching on a torque-lowering action after said torque-changing gear rotates through a portion of a total given rotational path thereof, a return travel lock for locking said torque-changing gear in place, and means for releasing said return travel lock before said driver becomes operative.

2. Rotary drive according to claim 1, including a symmetrical path in two directions of rotation having two end positions, and a stop for each of said end positions, said driver providing a torque-changing action upon leaving each of said two end positions.

3. Rotary drive according to claim 1, wherein sid torque-changing gear is a coaxial branching gear having a ratio of substantially between 1:2 and 1:5.

4. Rotary drive according to claim 3, wherein said coaxial branching gear is a planetary gear having a fixed housing, a hollow ring revolving in said housing, at least one planet wheel, a planet carrier with an output shaft, and a sun wheel with a drive shaft.

5. Rotary drive according to claim 4, wherein said driver couples said planet carrier to said hollow ring.

6. Rotary drive according to claim 4, wherein said return travel lock is in the form of two blocking elements disposed on said hollow ring for substantially completely blocking rotation of said hollow ring in both directions, and said releasing means are in the form of at least one protrusion on said planet carrier for releasing one of said blocking elements at a time.

7. Rotary drive according to claim 6, wherein said housing has an inner surface, and said blocking elements are pawls each having a respective pivot shaft, said pawls engaging grooves formed in said inner surface of said housing in a form-locking and self-locking manner.

8. Rotary drive according to claim 4, wherein said return travel lock is a toggle lever, and including a restoring spring biasing said toggle lever, and a protrusion neutralizing said restoring spring in at least one given position.

9. Rotary drive according to claim 4, wherein said hollow ring has an inclined surface, said return travel lock is a roller travelling on said inclined surface and frictionally self-locking in the circumferential direction as a result of a large radial force increase, and said releasing means are in the form of a restoring spring biasing said roller.

10. Rotary drive according to claim 7, wherein said releasing means are in the form of restoring spring biasing said pawls, said at least one protrusion neutralizing said restoring springs in at least one given position.

11. Rotary drive according to claim 10, wherein said restoring spring is a spiral spring.

12. Rotary drive according to claim 10, wherein said restoring spring is a helical spring.

13. Rotary drive according to claim 6, wherein said blocking elements each have a respective extension, said extensions being mutually staggered in axial direction of one of said shafts, and said at least one protrusion is in the form of two axially staggered rollers each contacting a respective one of said extensions.

14. Rotary drive according to claim 13, wherein said housing has an inner surface with grooves formed therein, said blocking elements each have a respective pivot shaft about which said blocking elements are pivotal into and out of engagement with said grooves, said extensions of said blocking element have inner contours substantially in the shape of a circular arc over most of said contours when said blocking elements are pivoted out of engagement with said housing grooves, said circular arc has a center disposed along one of said shafts, and said extensions have ends facing away from said respective pivot shafts at which said inner contours bend outward and rest substantially along said circular arc when said blocking elements are forced into engagement by said restoring springs.

15. Rotary drive according to claim 1, including a self-locking element connected between said torque-changing gear and the control device for firmly retaining the control device in at least one direction of movement in the end position thereof.

16. Rotary drive according to claim 1, wherein said self-locking element is a threaded spindle.

17. Rotary drive according to claim 1, wherein said torque-changing gear has an output side and a central hollow space providing space for a valve spindle on said output side.

18. Rotary drive according to claim 4, including a layshaft gear disposed between said motor and said sun wheel.

19. Rotary drive according to claim 18, wherein said layshaft gear is not self-locking.

20. Rotary drive according to claim 18, wherein said layshaft gear is a spur gear or a planetary gear.

21. Rotary drive according to, claim 18, wherein said layshaft gear is a coaxial cycloid gear or a sliding wedge gear.

22. Rotary drive according to claim 21, wherein said motor has a shaft, said layshaft gear is a two-disk sliding wedge gear surrounding said motor shaft including an output disk, and including a hollow shaft connected to said output disk and forming a hollow space for receiving a valve spindle.

23. Rotary drive according to claim 22, wherein said hollow shaft has an end facing toward said motor, and including a sheet-metal cap closing off said end of said the hollow shaft, said sheet-metal cap being spaced from said motor shaft by at most 10 mm.

24. Rotary drive according to claim 22, wherein said motor shaft has a given rotary speed, and said hollow shaft has a rotary speed being at most one-tenth of said given rotary speed.

25. Rotary drive according to claim 22, wherein said sliding wedge gear has an axially loadable sliding or roller bearing between said two disks.

26. Rotary drive according to claims 22, wherein said torque-changing gear is a planetary gear acted upon by said sliding wedge gear, said planetary gear including a hollow output shaft and a hollow ring fixed in axial direction between ball bearings on said output shaft of said sliding wedge gear and on said hollow output shaft of said planetary gear.

27. Rotary drive according to claim 22, wherein said sliding wedge gear and said torque-changing gear are disposed in said housing, said housing is mostly formed of a lightweight metal, and said housing has engagement points for said return travel lock and steel inserts in the vicinity of said engagement points.

28. Rotary drive according to claim 27, wherein said housing includes two axially staggered housing shells, said inserts are in the form of a ring disposed between said housing shells, and including screws passing through and engaging said ring for interconnecting said housing shells.

29. Rotary drive according to claim 28, wherein one of said housing shells is an output-side housing shell having threaded blind bores formed therein for attaching the control device.

30. Rotary drive according to claim 22, wherein said two-disk sliding wedge gear includes a stationary disk having a force gauge for measuring torque of said wedge gear.

31. Rotary drive according to claim 30, wherein said stationary disk is resiliently fixed in said housing in circumferential direction, and including an end switch actuated by said stationary disk if a predetermined torque is exceeded.

32. Rotary drive according to claim 30, including a strain gauge fixing said stationary disk in circumferential direction in said housing.

33. Rotary drive according to claim 1, including a manual drive having a disk mounted in place of a motor fan.

\* \* \* \* \*